June 11, 1968   F. P. BENNETT   3,387,535
PREVIEWING MEANS FOR PROJECTORS
Filed Aug. 8, 1966   2 Sheets-Sheet 1

INVENTOR.
FRANK P. BENNETT
BY
ATT'YS.

June 11, 1968 F. P. BENNETT 3,387,535
PREVIEWING MEANS FOR PROJECTORS

Filed Aug. 8, 1966 2 Sheets-Sheet 2

INVENTOR.
FRANK P. BENNETT
BY
ATT'YS.

3,387,535
PREVIEWING MEANS FOR PROJECTORS
Frank P. Bennett, Northbrook, Ill., assignor, by mesne assignments, to General Aniline & Film Corporation, New York, N.Y., a corporation of Delaware
Filed Aug. 8, 1966, Ser. No. 570,899
12 Claims. (Cl. 88—24)

ABSTRACT OF THE DISCLOSURE

The previewing attachment includes a housing which is detachably mounted on the top of a slide projector. The previewer includes a mirror movable relative thereto between an operative and an inoperative position. In the operative position, this mirror intercepts the projector optical axis between the projection gate and the projector objective lens assembly. In this inoperative position, this mirror is moved out of the projector optical axis and does not interfere with normal projection on a remote screen. The previewer includes a rear projection screen and its own lens assembly for focusing an image on such screen when the aforementioned mirror is in its operative position.

---

The present invention relates in a general way to projectors, such as slide projectors and movie projectors, and more particularly the present invention relates to previewer associated with such projectors to permit viewing of an image before projection on a remote screen.

A primary object of the present invention is to provide a previewer adapted for association with a projector to permit selective viewing of an image before projection thereof on a remote screen, wherein such previewer includes focusing means thereby obviating refocusing when selecting either previewing or projection on a remote screen.

Another object of the present invention is the provision of a previewer according to the foregoing object wherein such previewer includes a mirror mounted for movement between an operative and an inoperative position, such mirror in the operative position thereof being disposed in the projector optical path forwardly of the projection gate for intercepting a projected image and reflecting the same on a screen forming part of the previewer.

Still another object of the present invention is the provision of a previewer in accordance with the foregoing objects and further including one or more additional mirrors defining a folded optical path between the first mentioned mirror and the previewer screen.

Another object of the present invention is the provision of a previewer according to the foregoing objects, which previewer is adapted for detachable engagement with a slide projector having an opening in the shell or housing thereof adjacent the space between the projection gate and the projector objective lens assembly, wherein the aforementioned mirror, in the operative position thereof, is disposed in the projector optical path between the projection gate and the projector objective lens.

These and other objects and advantages of the invention will become apparent from the following specification disclosing a preferred embodiment of the invention illustrated in the accompanying drawings wherein.

Figure 2:
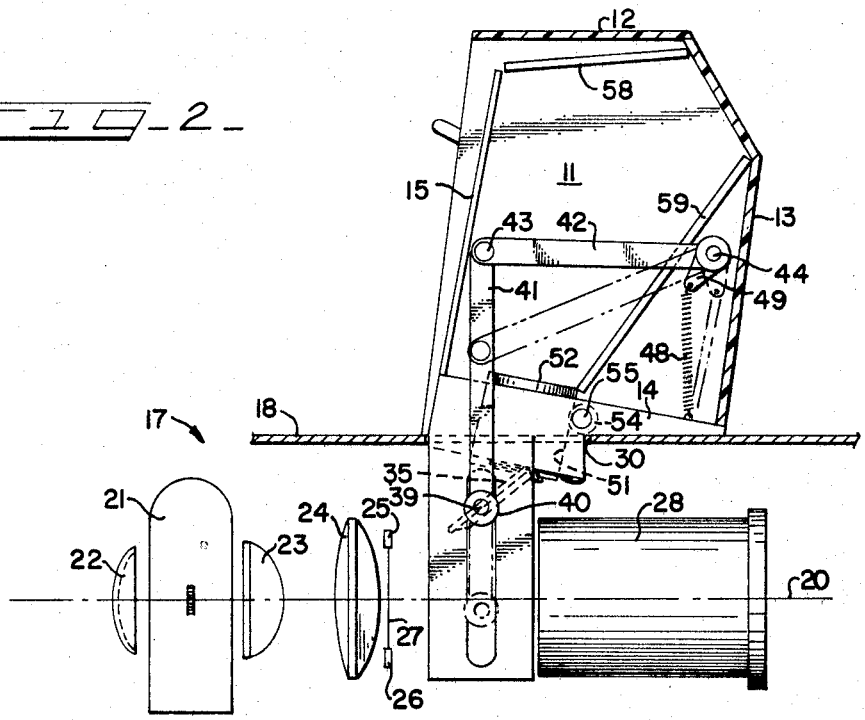
FIG. 2 is a vetrical central section of the previewer and an associated slide projector, with the movable mirror of the previewer being shown in its inoperative position.

Referring to the drawings, the embodiment of the previewer shown for purposes of illustration, generally designated 10, will be seen to include a generally boxlike housing defined by side walls 11, a top wall 12, a bent rear wall 13, a base 14, and a front wall consisting of a translucent or rear projection screen 15. The previewer 10 is adapted to be detachably or removably mounted on a projector, such as a slide projector generally designated 17.

The slide projector, which of itself forms no part of the present invention, includes a housing or shell 18 including the usual components defining the projector optical path or axis 20. These components include a projection light source consisting of a lamp 21, a reflector 22, and a lens 23. The projector optical axis is further defined by a lens 24 mounted adjacent respective upper and lower slide guides 25 and 26, which guides define the projection gate for supporting a photographic slide 27 in a position to be projected. The projector optical axis is further defined by an objective lens assembly including a tubular member 28 mounted by suitable means (not shown) for movement axially of the optical axis 20. Tubular member 28 includes the usual objective lenses for focusing an image on a remote screen upon axial movement of the member 28 in a manner well known in the art.

The previewer is detachably mounted on the projector by resting engagement of the base 14 on the projector shell 18, which shell is provided with a generally rectangular opening 30 disposed or located above the space between the slide projection gate and the objective lens holder or tubular member 28. Base 14 mounts a right angle bracket 31 having one leg 31a secured to base 14 and a depending leg 31b which extends in vertical disposition when base 14 rests on projector shell 18. Leg 31b includes a longitudinally extending relieved area 32 on the inside face thereof, which area slidably mounts a plate 33. Plate 33 supports at a right angle thereto a mirror 35 in inclined relation with the horizontal. A shade 36 formed of flexible, opaque material is secured to the mirror 35 and has the other end thereof connected to leg 31a of the bracket 31.

Leg 31b is provided with a slot 38 extending along the length thereof, which slot receives a pin 39 having one end thereof secured to the plate 33 and the other end thereof mounting a washer 40 slidably engaging the outside face of the leg 31b. The sliding engagement between the washer 40 and the leg 31b serves to secure plate 33 to the bracket 31 for reciprocal sliding movement in the relieved area or slideway 32. Such sliding movement of plate 33 carries the mirror 35 for movement between a lower or operative position shown in full lines in FIG. 3 and an upper or inoperative position shown in broken lines in FIG. 2.

The mirror is reciprocated between its operative and inoperative positions by a linkage arrangement including a first link 41 having the lower end thereof pivotally connected to pin 39. The upper end of this link is pivotally connected to one end of another link 42 by means of a pin 43. The other end of link 42 is fixed to a cross shaft 44, which shaft has opposite ends thereof suitably journaled in respective side walls 11 of the previewer housing. It will be understood that rotation of the shaft 44 causes swinging movement of the arm 42 for moving the same between the solid and phantom line position shown in FIG. 2.

Figure 1:
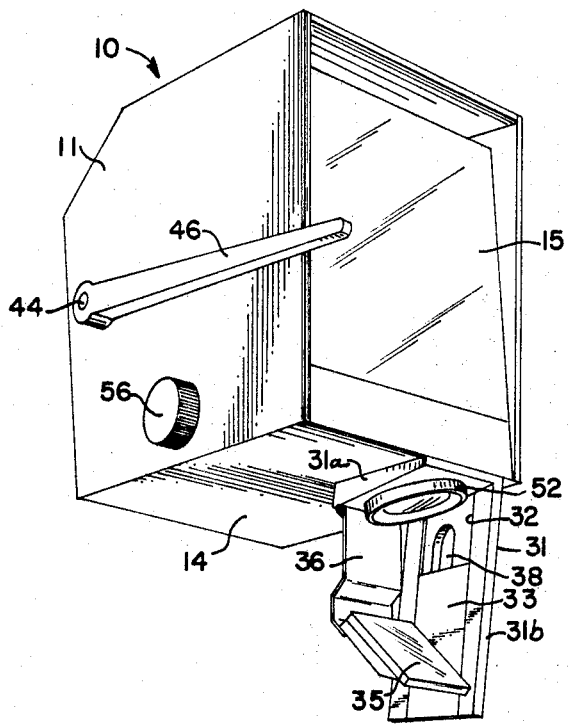
FIG. 1 is a perspective view of the previewer.

As noted in FIG. 1, one end of the shaft 44 extends exteriorly of the previewer housing and mounts an operating lever 46. It should be apparent that mirror 35 can be moved back and forth between its operative and inoperative positions by manipulation of the lever 46. The mirror 35 is yieldably maintained in both its operative and inoperative positions by means of an over-center spring arrangement including a spring 48 having one end thereof connected to the previewer base 14 and the other end thereof connected to a lug 49, which lug is fixed to the shaft 44. The spring 48 is under compression at all times and serves yieldably to maintain the mirror 35 in both its upper or inoperative position and its lower or operative position.

Base 14 of the previewer housing includes an inclined bore 51 slidably mounting a tubular member 52 which mounts one or more lenses (not shown). The tubular member 52 includes an exterior, longitudinally extending rack or series of gear teeth (not shown) in meshing engagement with a gear 54 fixed on a shaft 55, which shaft is rotatably mounted in a bore formed in base 14. One end of shaft 55 extends exteriorly of the previewer housing and mounts a focusing knob 56 as seen in FIG. 1. It will be understood that rotation of the knob 56 serves to move the tubular member 52 axially in the bore 51 depending on the direction of rotation of the knob 56. It will be understood that such movement of the tubular member 52 provides for focusing an image on the rear of translucent screen 15.

The previewer includes a folded optical system including an upper mirror 58 suitably mounted in the previewer housing. This folded optical system also includes a rear mirror 59 which is appropriately mounted in the previewer housing.

Figures 3, 4, 5:
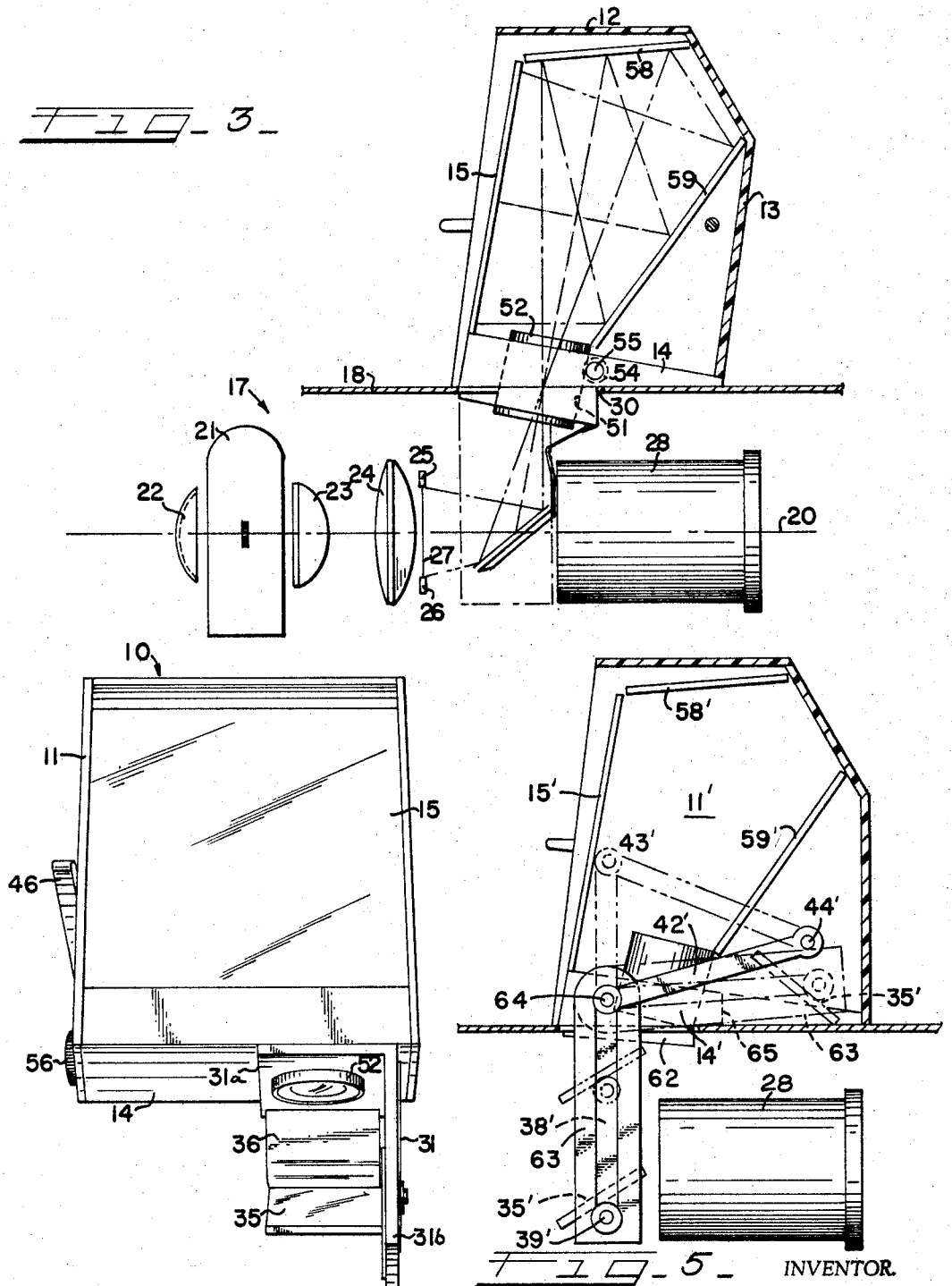
FIG. 3 is a section similar to FIG. 2 but showing the movable mirror in its operative position.
FIG. 4 is a perspective view looking generally from left to right as viewed in FIGS. 2 and 3.
FIG. 5 is a section similar to FIG. 3 and showing a modification of the previewer of this invention.

The operation of the previewer is as follows:

The previewer is detachably supported on the projector 17 by resting the base 14 on the shell 18 with the bracket leg 31b extending downwardly through the opening 30. When the mirror 35 is in its uppermost or inoperative position (FIG. 2), the image of a slide 27 is projected through the objective lens assembly 28 and onto a remote screen in the normal manner. When it is desired to view the image on the rear projection screen 15, lever 46 is moved to lower mirror 35 to its lowermost or operative position (FIG. 3). The image is then reflected by the mirror 35 through the lenses in the tubular member 52, to the mirror 58, then to the mirror 59 and onto the rear of the translucent screen 15, as indicated by the phantom lines in FIG. 3. Knob 56 is manipulated for sharply focusing this image on the rear of the screen 15. Once an image has been focused by manipulating knob 56, successive slides or frames presented to the projection gate defined by the guides 25, 26 need not be re-focused. When the lever 46 is moved to raise the mirror 35 to its inoperative position, the projector 17 again projects the image on a remote screen in the normal manner. The shade 36 prevents stray light from passing through the lenses in the tube 28 when the previewer is in operation, i.e., when the mirror 35 is in its lowermost or operative position.

It will be appreciated that the previewer according to this invention may be constructed as an integral part of a projector. It will further be understood that the previewer is not to be limited to any particular form of slide projector as it is within the spirit and scope of the invention to adapt the previewer for use on other slide projectors and movie projectors as well.

It should be appreciated that the present invention provides the unique and effective means for quickly and easily viewing an image before or after projection thereof on a remote screen. The previewer includes its own focusing means and is not dependent on the projector focusing system which is provided by adjusting the projector objective lens assembly.

As noted in FIGS. 1 and 4, the previewer housing is not symmetrical with respect to the longitudinal central axis of the tubular member 52. In the embodiment of the invention shown for purposes of illustration, the previewer housing has been offset with respect to the central axis of the tubular member 52 to permit clearance between the previewer housing and the magazine of a slide projector with which a prototype model of the previewer has been used. Thus offsetting of the previewer housing with respect to the axis of the tube 52 does not affect the operation of the previewer. It will be understood that the previewer housing may be positioned laterally with respect to the longitudinal central axis of the tubular member 52 within the limits of the width of the housing, and that the previewer is not to be limited to the particular form shown.

The modified previewer shown in FIG. 5 is the same in all respects with the previewer of FIGS. 1–4 except for the mounting of the arm which supports the mirror for movement between operative and inoperative positions. The parts of the modified previewer which are the same as the parts of the aforedescribed previewer are indicated by the prime form of numeral.

In lieu of the bracket 31 mentioned above, the tubular member 52 is mounted in a member 62 which corresponds to the bracket leg 31a, and the mirror 35 is mounted by an arm 63 which corresponds to the bracket leg 31b. The arm 63 is the same as the leg 31b insofar as mounting of the mirror 35 is concerned. The arm 63 is pivotally mounted at its upper end to the inside surface of the adjacent previewer wall 15' by a fixed pin 64. The pin 64 is arranged so as to be coaxial with the pin 43' when the mirror 35' is in its lowermost or operative position.

A narrow slot is provided between the side wall 15' just mentioned and the adjacent side of base 14' so as to define a slot permitting arm 63 to be swung in a counter-clockwise direction to the broken line or stored position indicated in FIG. 5. Base 14' has a cutout portion 65 to receive the mirror 35' within the lowermost portion of the previewer housing.

When the modified previewer is to be stored during periods of nonuse, the mirror 35' is lowered to its operative position, and the arm 63 is then swung for storing the latter and the mirror 35' within the lowermost portion of the previewer. This construction facilitates storing and packaging of the previewer and also provides a means to protect the mirror 35' when the previewer is not in use. It will be realized that suitable detent means (not shown) may be provided for yieldably holding arm 63 in both its solid line and broken line positions indicated in FIG. 5.

While the invention has been shown in but one form, it will be obvious to those skilled in the art that it is not to be so limited. On the contrary, the invention is susceptible of various forms and modifications without departing from the spirit and scope of the appended claims.

I claim:

1. In a projector having an optical path defined by a projection light source, a projection gate and an objective lens assembly which is movable for focusing an image projected on a remote screen, the improvement comprising, previewing means for viewing an image before projection thereof on such remote screen, said previewing means including, a mirror and means on the projector mounting the former for movement relative to the previewer between an operative and an inoperative position, said mirror in the operative position thereof being disposed in said projector optical path between said projection gate and said objective lens assembly thereby serving to intercept a projected image and reflect the same along a path at an angle with the projector optical path, said mirror in the inoperative position thereof being spaced from said projector optical path in non-interfering relation with projection on a remote screen, a translucent screen supported by said projector and positioned for having an image projected on the rear thereof when said mirror is in its operative position, and a secondary objective lens assembly movably mounted by said projector for focusing an image on said translucent screen.

2. The improvement according to claim 1 wherein said previewing means includes at least one other mirror cooperating with the first mentioned mirror to define a folded optical path between the latter and said translucent screen.

3. A previewer for use with a projector of the type including a shell and an optical path defined by a projection light source, a projection gate and an objective lens assembly which is movable to focus an image projected on a remote screen, said previewer including a housing adapted to be detachably mounted by said shell, said housing including a member supporting a mirror for movement relative to the housing between an operative and an inoperative position, manually operated means on said housing for moving said mirror between said positions, said mirror in the operative position thereof being disposed in said projector optical path between said projection gate and said objective lens assembly thereby serving to intercept a projected image and reflect the same along a path at an angle with the projector optical path, said mirror in the inoperative position thereof being spaced from said projector optical path in non-interfering relation with projection on a remote screen, said housing having one wall thereof defined by a translucent screen, said translucent screen being positioned to have an image projected on the rear thereof when said mirror is in its operative position, and a secondary objective lens assembly movably mounted by said housing for focusing an image on said translucent screen.

4. The previewer according to claim 3 wherein at least one other mirror is mounted within said housing, said other mirror cooperating with the first mentioned mirror to define a folded optical path between the latter and said translucent screen.

5. The previewer according to claim 3 further defined by, said member including an arm slidably mounting said first mentioned mirror, said manually operating means including a hand operable member and a linkage arrangement connecting the same with the first mentioned mirror.

6. The previewer according to claim 5 further defined by, an over-center spring arrangement connected with said linkage for yieldably holding said first mentioned mirror in both its operative and inoperative positions.

7. The previewer according to claim 3 further defined by, said member being movably mounted by said housing so as to be swung between an extended position and a stored position, said housing having a storage cavity for receiving said member and said mirror therein.

8. In combination, a slide projector including a shell and an optical path defined by a projection light source, a slide projection gate and an objective lens assembly which is movable to focus an image projected on a remote screen, said shell having an opening adjacent the space between said gate and said objective lens assembly, a previewer including a housing adapted to be detachably supported by said shell in enclosing relation with said opening, said housing including a member extending into said shell through said opening and supporting a mirror for movement between an operative and an inoperative position, means on said housing for moving said mirror between said positions, said mirror in the operative position thereof being disposed in said projector optical path between said projection gate and said objective lens assembly thereby serving to intercept a projected image and reflect the same along a path which passes through said opening, said mirror in the inoperative position thereof being spaced from said projector optical path in non-interfering relation with projection on a remote screen, said housing having one wall thereof defined by a translucent screen, said translucent screen being positioned to have an image projected on the rear thereof when said mirror is in its operative position, and a secondary objective lens assembly movably mounted by said housing for focusing an image on said translucent screen.

9. The combination according to claim 8 wherein said previewer includes at least one other mirror cooperating with the first mentioned mirror to define a folded optical path between the latter and said translucent screen.

10. The combination according to claim 9 further defined by, said member including an arm slidably mounting said first mentioned mirror, said manually operating means including a hand operable member and a linkage arrangement connecting the same with the first mentioned mirror.

11. The combination according to claim 10 further defined by, an over-center spring arrangement connected with said linkage for yieldably holding said first mentioned mirror in both its operative and inoperative positions.

12. The previewer according to claim 8 further defined by, said member being movably mounted by said housing so as to be swung between an extended position and a stored position, said housing having a storage cavity for receiving said member and said mirror therein.

References Cited
UNITED STATES PATENTS

| | | | |
|---|---|---|---|
| 3,094,037 | 6/1963 | Kapilow | 352—104 X |
| 3,138,057 | 6/1964 | Castedello et al. | 352—129 X |

NORTON ANSHER, *Primary Examiner.*

JOHN M. HORAN, *Examiner.*

GEORGE M. HOFFMAN, *Assistant Examiner.*